Patented Feb. 24, 1942                                    2,274,602

UNITED STATES PATENT OFFICE 2,274,602

PRESERVATION OF SEMIHARD RUBBER COMPOSITIONS

Ray O. Hendrix, Akron, Ohio, assignor to The B. F. Goodrich Company, New York, N. Y., a corporation of New York No Drawing. Application July 25, 1940,
Serial No. 347,477

16 Claims.  (Cl. 260—808)

This invention relates to the preservation of semi-hard rubber compositions, and particularly to a method whereby the embrittlement and hardening of such compositions is retarded.

Ordinary soft vulcanized rubber is usually made by vulcanizing rubber in the presence of not over about 5% of sulfur. Hard rubber compositions are ordinarily prepared by vulcanizing rubber in the presence of 35–40% or more of sulfur. Vulcanization of rubber in the presence of from 10–30% of sulfur produces semi-hard rubber compositions about which not nearly as much is known as about the ordinary hard and soft vulcanizates.

These semi-hard vulcanizates are very useful as typewriter platen cylinders, flexible tank linings, etc. It has been observed, however, that these semi-hard vulcanizates gradually harden and become brittle upon aging. Antioxidants which are useful for retarding the deterioration of soft vulcanizates do not in general retard this hardening and embrittlement. In fact, many commercial antioxidants have been found to hasten the embrittlement of semi-hard rubber compositions.

I have discovered that the deterioration of semi-hard rubber compositions may be retarded by treating the rubber with alkoxy-substituted diarylamines. Examples of suitable materials include p-isopropoxydiphenylamine, p-isopropoxyphenyl-beta-naphthylamine, isobutoxydiphenylamine, p-methoxydiphenylamine, di-p-methoxydiphenylamine, p - ethoxydiphenylamine, etc. Further specific examples of satisfactory materials are contained in U. S. Patent No. 1,965,948 issued to Waldo L. Semon, and in U. S. Patent No. 2,044,059 issued to William S. Calcott et al.

As a specific example of one embodiment of this invention, the following compositions were prepared:

| Ingredient | Parts by weight | | |
|---|---|---|---|
| | 1 | 2 | 3 |
| Rubber | 100 | 100 | 100 |
| Sulfur | 25 | 25 | 25 |
| Polybutylidene-aniline | 0.5 | 0.5 | 0.5 |
| p-Isopropoxydiphenylamine | 0 | 2 | 0 |
| p,p'-Dimethoxydiphenylamine | 0 | 0 | 2 |

These compositions were vulcanized in a heated mold for varying times at 300° F. The semi-hard vulcanizates were then aged for 96 hrs. in a bomb at 70° C. under an oxygen pressure of 300 lbs./sq. in. The elongation at break of both unaged and aged samples was determined. The behavior of the different samples is shown in the following table:

| Composition | Min. cure | Percent elongation retained after aging |
|---|---|---|
| 1 | 150 | 7.5 |
| 1 | 180 | 8.1 |
| 2 | 150 | 75 |
| 2 | 180 | 55 |
| 3 | 150 | 65 |
| 3 | 180 | 76 |

It can readily be seen that the compositions containing the alkoxydiarylamine resisted deterioration much better than the samples containing no antioxidant. Further tests with well-known antioxidants for soft rubber showed that the incorporation of diarylamines and the quinoline-type antioxidants formed by the reaction of aldehydes and amines produced compositions which deteriorated even more rapidly than the control.

It is to be understood that the term "treating" is employed in the appended claims to include either the incorporation of the alkoxydiarylamines into the rubber by mixing them into the said material while it is in a plastic or fluid condition, or by applying in the form of a paste, powder, or solution to the surface of a solid mass thereof. The alkoxydiarylamines are preferably included in the composition in a proportion of from 2 to 3 parts by weight per 100 parts of rubber, although smaller proportions may be employed where less protection is required and larger proportions may be employed if desired.

It is to be understood that the scope of this invention is not to be limited to the materials used for illustrative purposes, for it is susceptible of numerous modifications including substitution of equivalent materials and variation of the amounts of materials used without exceeding the spirit and scope of the invention as defined in the appended claims.

I claim:

1. The method of retarding the deterioration of a semi-hard rubber composition which comprises treating the composition with an alkoxy-substituted diarylamine.

2. The method of retarding the deterioration of a semi-hard rubber composition which comprises treating the composition with a diarylamine in which one aryl group carries an alkoxy substituent.

3. The method of retarding the deterioration of a semi-hard rubber composition which comprises treating the composition with a diarylamine in which one aryl group carries an isopropoxy substituent.

4. The method of retarding the deterioration of a semi-hard rubber composition which comprises treating the composition with a diphenylamine in which one phenyl group carries an alkoxy substituent in the para position.

5. The method of retarding the deterioration of a semi-hard rubber composition which comprises treating the composition with p-isopropoxydiphenylamine.

6. The method of retarding the deterioration of a semi-hard rubber composition which comprises treating the composition with a diarylamine in which both aryl groups contain alkoxy substituents.

7. The method of retarding the deterioration of a semi-hard rubber composition which comprises treating the composition with diphenylamine in which both phenyl groups contain an alkoxy substituent in the para position.

8. The method of retarding the deterioration of a semi-hard rubber composition which comprises treating the composition with p,p'-dimethoxydiphenylamine.

9. A semi-hard rubber composition which has been vulcanized in the presence of an alkoxy-substituted diarylamine.

10. A semi-hard rubber composition which has been vulcanized in the presence of a diarylamine in which one aryl group carries an alkoxy substituent.

11. A semi-hard rubber composition which has been vulcanized in the presence of a diarylamine in which one aryl group carries an isopropoxy substituent.

12. A semi-hard rubber composition which has been vulcanized in the presence of a diphenylamine in which one phenyl group carries an alkoxy substituent in the para position.

13. A semi-hard rubber composition which has been vulcanized in the presence of p-isopropoxydiphenylamine.

14. A semi-hard rubber composition which has been vulcanized in the presence of a diarylamine in which both aryl groups contain alkoxy substituents.

15. A semi-hard rubber composition which has been vulcanized in the presence of diphenylamine in which both phenyl groups contain an alkoxy substituent in the para position.

16. A semi-hard rubber composition which has been vulcanized in the presence of p,p'-dimethoxydiphenylamine.

RAY O. HENDRIX.